United States Patent [19]
Welsh

[11] 4,073,578
[45] Feb. 14, 1978

[54] SPECTACLE LENS FOR APHAKIA PATIENTS

[75] Inventor: Robert C. Welsh, Coconut Grove, Fla.

[73] Assignee: Phillip M. Frieder, Miami, Fla. ; a part interest

[21] Appl. No.: 570,218

[22] Filed: Apr. 21, 1975

[51] Int. Cl.² .................... G02C 7/02; G02B 3/04
[52] U.S. Cl. .................... 351/167; 350/189; 351/176
[58] Field of Search ............... 351/167, 176; 350/189, 350/192

[56] References Cited

U.S. PATENT DOCUMENTS

| 2,096,524 | 10/1937 | Martin | 350/189 |
| 3,169,247 | 2/1965 | Davis et al. | 351/167 |
| 3,781,097 | 12/1973 | Bechtold | 351/167 |

OTHER PUBLICATIONS

Welsh, Postoperative Cataract Spectacle Lenses Textbook, published in 1961, cover and pp. 6, 26E, 26F, 37C, 37D, 93B and 93C.

*Primary Examiner*—Paul A. Sacher
*Attorney, Agent, or Firm*—Stevens, Davis, Miller & Mosher

[57] ABSTRACT

A spectacle lens having an anterior surface curvature, the anterior surface having a spherically shaped central vision surface area from 12 to 16 diopters and a peripheral, aspherical surface area surrounding the center vision spherical area, the aspherical surface area formed with a uniform diopter gradient varying from the central vision surface area edge to the outer circumference of the lens. The aspherical diopter rate of change, approximately one-third diopter per millimeter which is reduced from the spherical area toward the outer lens circumference, improves the peripheral vision of a person having aphakia when looking through the central vision portion, while eliminating the pin cushion effect found in conventional lenses which result from overpowering in the outer areas of the lens. The lens is useful for improving the vision of one having aphakia when looking through the central vision area and teaching the patient to rotate his head rather than his eyes to more clearly observe objects by re-establishing a new center vision point.

9 Claims, 2 Drawing Figures

SPECTACLE LENS FOR APHAKIA PATIENTS

BACKGROUND OF THE INVENTION

This invention relates generally to an improved spectacle lens for a person who has had his eye lens removed, and specifically to an improved spectacle lens and lens blank which improves the vision of one having aphakia. In the past, many different types of aphakia lenses have been shown which have all tried to correct for sagital and tangential errors to eliminate spherical aberration and astigmatic errors inherent in a lens. Although many of these lenses of the prior art have provided for a technically correct lens surface which reduces tagential and sagital errors, the Applicant has discovered that the vision of a patient having aphakia can be materially improved without being overly concerned with the sagital and tagential error corrections in the outer surface areas of the lens but by providing a uniform diopter gradient from the central vision area edge to the outer circumference of the lens, the diopter gradient reducing the pin cushion effect which causes instability while walking in many patients having aphakia. Further, through the use of the instant invention, the patient can be taught to move his head rather than his eyes such that through head movement the patient will be able to use the central vision area and the peripheral areas provided by the instant invention. Many of the lenses in the prior art have attempted to technically correct the outer areas beyond the center vision areas so that the wearer may rotate his eyes and his vision would not be substantially distorted. However, this attempt to correct the outer areas resulted in a lens which provides a great peripheral distortion to the wearer and thus oftentimes causes the wearer to be disoriented because of the distortion he observes in the outer peripheral area. This is because in the prior art lenses the outer areas were over powered (increased magnification) which resulted in the distortion. The instant invention provides a diopter reduction significant in the outer peripheral area of the lens to reduce and eliminate peripheral vision distortion in a patient having aphakia while he is observing through the center vision and increases the angular peripheral vision available to the patient. If the patient should move his eyes to look away from the central vision area of the lens, he will then observe distortion which teaches the wearer or the patient to use his head so that rather than attempt to look and move the eyes away from the central vision portion of the lens to the side areas directly, he will rotate his head such that he is still looking directly through the central vision area when he is looking at an object. The instant invention has an excessive amount of asphericity which will also serve to reduce the ring scotoma size by 50%. This makes side vision more reliable for aphakic patients. A lens in accordance with the instant invention may be molded as a blank with the interior surface having the diopter gradient of the instant invention while for individuals the posterior surface can be ground to the patient's prescription.

BRIEF DESCRIPTION OF THE INVENTION

A convergent spectacle lens for patients having aphakia or the like, the lens having an anterior curved surface and a posterior curved surface with the invention herein being confined to the curvature of the anterior surface of said lens, said anterior curved surface having a centrally located spherically curved portion, said central spherically curved portion being curved at one particular diopter power (usually 12–16 diopters), the radial distance in the center of said spherical curvature being from between 12 millimeters and 15 millimeters radius from the central axis portion of said spherically curved area. From the central vision spherical surface area, according to the instant invention the anterior surface is then aspherically shaped, having approximately a one-third diopter per millimeter gradient beginning at the outer edge of the central spherical area diminishing to the outer circumference of the lens or the lens blank. In a typical lens blank in accordance with the instant invention, a sixty millimeter diameter blank having a 24 to 30 millimeter central vision area which is spherically molded for 12, 14 or 16 diopters, the peripheral surface area is aspherically formed having a diopter gradient which begins at the 12, 14 or 16 diopter power of the central vision area and is reduced to a valve between 3.25 to 7.50 diopters at the outer circumference of the lens blank. A typical example would be to have the outer perimeter of the lens blank at seven diopters for a twelve diopter center vision area. By reducing the diopter magnitude in the exterior aspherical area, Applicant has found that the peripheral vision of a patient having aphakia is greatly improved in that pin cushion distortion present in prior art lenses has been greatly reduced or eliminated when the patient is viewing through the central vision axis. The range of diopter reduction on the aspheric portion of the lens or lens blank may be varied somewhat but should be approximately a one-third diopter per millimeter reduction. There may be some variations when changing from a 12 to 14 or 16 diopter central vision portion while also the diameter lengths of the central vision zone may be adjusted. With the configuration and the diopter gradient in the aspheric curvature area, the wearer if rotating the eyes in an attempt to look through the lens peripheral area will see distortion, which is beneficial in that while increasing the peripheral vision when looking directly through the center vision of the lens the patient will be trained to rotate the head to see objects off to the side rather than attempt to rotate the eyes, which has been common in the use of prior art lenses. The other lenses of the prior art while attempting to correct for astigmatism and spherical aberration resulted in a reduction in the peripheral vision of the patient when the patient is viewing through the center vision area of the lens.

It is an object of this invention to provide an improved spectacle lens for patients having aphakia.

It is another object of this invention to provide a spectacle lens to improve the visual acuity of a person having an eye lens removed.

And still yet another object of this invention is to provide a spectacle lens for patients having aphakia when viewing through the central vision areas of the lens and also aids in training the patient to rotate the head rather than the eyeballs for viewing objects on either side of the patient.

But still yet another object of this invention is to provide a spectacle lens having a spherically-shaped central vision area with an exterior circumferential peripheral viewing area having a diopter gradient which decreases the diopter power from the edge of the central vision area toward the outer circumference of the lens.

In accordance with these and other objects which will be apparent hereinafter, the instant invention will now be described with particular reference to the accompanying drawings.

PREFERRED EMBODIMENT OF THE INVENTION

Figure 1:
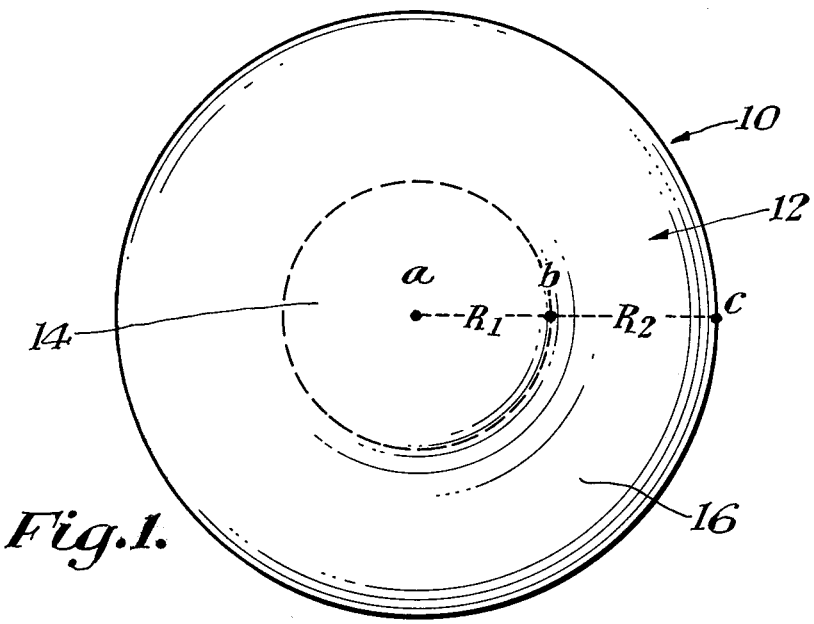
FIG. 1 shows a front elevational view of a lens showing the anterior surface in accordance with Applicant's invention.

Referring now to the drawings and in particular FIG. 1, the instant invention is shown as a lens or lens blank 10 having an anterior surface portion 12 which may be separated into a central vision area 14 and a peripheral vision area 16 as described below. The posterior surface 18 (FIG. 2) is conventional and will not be discussed pursuant to the instant invention. It should be understood that the posterior surface is ground to a particular prescription for a particular patient while the instant invention may be formed and molded or ground as a blank. Referring back to FIG. 1, the instant invention is shown comprised of a plastic or glass material which is conventional as to the materials and does not constitute a part of this invention.

The lens blank 10 has an anterior surface 12 with the following curvature. The central vision area 14 which is defined by radius r1 from center axis "a" is spherically shaped having a diopter power of 12, 14 or 16 and a radius length of 12mm –15mm. Beginning at point B at the outer circumferential edge of the spherical surface 14 the diopter power is reduced incrementally to point C, the aspheric areas designated by R2. As a typical example, the diopter gradient would extend from 12 diopter at point B to 7 diopters at point C, the distance of R1 plus R2 being sixty millimeters (a standard blank diameter). The optimum diopter change has been found to be approximately one-third diopter per millimeter reduction from point B to point C. Thus, in accordance with the instant invention the surface area of the lens blank or any lens (which will be smaller in total diameter) has an aspherical surface contour on the anterior lens surface beginning at the outside circumferential edge of the central vision spherical surface area with a diopter reduction optimally of approximately one-third diopter per millimeter going towards the outer circumferential periphery of the lens such that there is a surface area portion 16 which is spherical with a diopter gradient.

Figure 2:
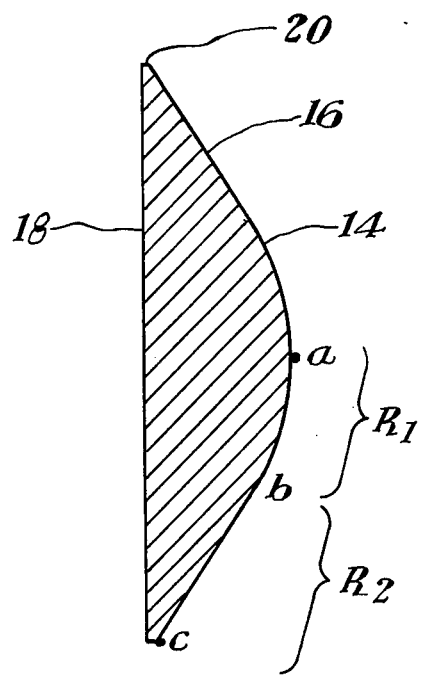
FIG. 2 shows a cross-sectional elevational view of a lens in accordance with Applicant's invention.

FIG. 2 shows the spherical area 14 and the peripheral surface 16 aspherically formed having a diopter gradient out to the edge of the lens blank 20. When using other diopter powers other than 12 (14 or even 16 in a few instances) for the spherical central vision area, the radial distance of the central vision area may be reduced, thus allowing for a range of between 12 and 15 millimeters radius of the central vision area. The diopter rate of change or reduction remains basically the same however beginning from the outside peripheral edge of the central vision area. Thus between points B and C there will be a taper or diopter power reduction according to the optimum which is approximately one-third diopter per millimeter proceeding from point B to point C. Thus the lens blank shown may be cut to a particular conventional lens size which would be from 46 to 56 millimeters in diameter. Thus the resultant diopter power at the outer periphery will be a function of the particular diameter size of a particular diameter size of a particular lens as cut.

Applicant has determined that by providing such a diopter gradient in the outer aspherical portion of the lens, a patient with aphakia can utilize the instant invention in a spectacle lens to reduce or eliminate pin-cushion distortion found in prior art lenses while increasing visual acuity in the area of peripheral vision when the patient is viewing through the central vision portion of the lens. The result is that the patient does not become as disoriented because of the pin cushion effect and the higher magnification found in the prior art lenses. The lens shown in the instant invention does not attempt to correct sagital or tangential errors such that rotation of the eyeball will prevent distortion in the peripheral areas when viewing directly through the peripheral areas. The distortion presented (when rotating the eyeballs) to a patient aids in teaching the patient to rotate the head in lieu of the eyeballs so that the patient will continue to look through the central vision area along the central axis of the lens at all times but while doing so with the instant invention will have improved peripheral vision. Thus, the instant invention as shown and described above has not been concerned with correcting spherical aberration or astigmatism caused by lens defects or curvature areas but has been shown to improve central vision and peripheral vision when the patient is viewing through the central vision area by eliminating the pin cushion effect which is generally caused by the increased magnification present in the prior art lenses.

The instant invention has been shown and described herein in what is considered to be the most practical and preferred embodiment. It is recognized, however, that departures may be made therefrom within the scope of the invention and that obvious modifications will occur to a person skilled in the art.

It is further understood and recognized that any form, design or type of reading bifocal segment or reading correction or correction for any other task designed to be accomplished at any distance less than optical infinity may be superimposed upon or within the curvature design in and described by the foregoing, and such imposition is contemplated as being within the scope of the instant invention.

The use of the within described curvature and design is such that use in a lenticular application would not be within the scope of the instant invention in that the current diameter of useful lens area available in lenticular lenses are too small to permit proper application of the appropriate diminution of curvature from the central zone to the edge of the lens blank as contemplated herein.

What I claim is:

1. An aspheric cataract spectacle lens for improving the peripheral vision of a person suffering from aphakia by forcing head movement for central viewing of side objects, the improvement comprising:

a lens body, said body having an anterior surface and an interior surface, said anterior surface having a central spherically curved area and a peripheral aspheric curved area, said aspheric curved area having a diopter rate of change beginning at the edge of said central vision area and extending to the body periphery of approximately a one-third diopter per millimeter, whereby the person is provided with improved peripheral vision of a side object when said person centrally fixates his eye relative to said lens body to further improve vision of said side object when said person rotates his head with his eyes centrally fixated looks directly at said object to make said side object clearer than if the person rotated his eye thus looking through said aspherical portion of said lens body which obscures said side object.

2. An aspheric cataract lens spectacle as set forth in claim 1 wherein:
said central curved area has a diameter of between 12 to 15 millimeters in radius and
a particular uniform diopter curvature of between 12 – 16 diopters.

3. An aspheric cataract spectacle lens blank having a central spherically curved area on its outer surface for physiologically improving a person's vision, the improvement comprising:
a lens body having an outer surface and an inner surface,
the outer surface having a central spherically curved area about an ocular axis,
the central area having a particular uniform diopter curvature of between 12 – 16 diopters and a radial length of between 12 – 15 millimeters from said ocular axis, and
an aspherical peripheral area surrounding said central area,
the diopter curvature of said aspherical peripheral area being the same as the central area adjacent the outer perimeter of said central area and radially decreasing in diopter power to between 3.25 to 7.50 diopters at the outer periphery of said lens body, whereby the person is provided with improved peripheral vision of a side object when said person centrally fixates his eye relative to said lens body and to further improve vision of said side object when said person rotates his head with his eyes centrally fixated looks directly at said object to make said side object clearer than if the person rotated his eye thus looking through said aspherical portion of said lens body which obscures said side object.

4. An aspheric lens for a centrally fixed eye of a person to provide wider fields of vision for said eye that does not rotate behind said lens comprising:
a lens body, said body having an anterior surface and an interior surface,
said anterior surface having a central spherical curved portion and a peripheral aspherical portion, the portion adjacent the edge of said peripheral aspherical portion having over-plussed characteristics to provide bothersome blur of vision of an eye rotating from a centrally fixed eye looking through the optical center and train the eye to stay centrally fixed and the person to turn his head,
said aspherical portion having a severe reduced diopter power relative to said central spherical portion to severely flatten said anterior surface toward the edge of the aspherical portion to reduce the prism angle at the edge to improve peripheral vision of a side object when said person centrally fixates his eye relative to said lens body and to diminish the width of the ring scotoma characteristic of high plus lenses by 50%.

5. An aspheric spectacle lens for a person suffering from aphakia providing an alternate to bifocals comprising:

a lens body, said body having an anterior surface and an interior surface,
said anterior surface having a central spherical curved portion to provide magnification by movement relative to the eye along the line of sight and a peripheral aspherical portion,
said aspherical portion having a curvature means relative to said central spherical portion to improve peripheral vision of a side object when said person centrally fixates his eye relative to said lens body and to further improve vision of said side object when said person rotates his head and with his eyes centrally vixated looks directly at said object to make said side object clearer than if the person rotated his eye thus looking through said aspherical portion of said lens body which obscures said side object,
said aspheric curved area having a diopter rate of change beginning at the edge of said central vision area and extending to the body periphery of approximately a one-third diopter per millimeter to decrease ring scotoma.

6. An aspheric cataract spectacle lens for providing a base for bifocals by adding peripheral vision inferior to a bifocal area comprising:
a lens body, said body having an anterior surface and an interior surface,
said anterior surface having a central spherically curved area for clear distance vision and a peripheral aspheric curved area for clear peripheral vision of a centrally fixed eye looking through the optical center of said lens,
said aspheric curved area having a diopter rate of change beginning at the edge of said central vision area and extending to the body periphery of approximately a one-third diopter per millimeter,
bifocal in said anterior surface keeping distance vision clear and peripheral vision clear inferiorly.

7. A method of training aspheric patients having eye lenses removed from an improved aspheric lens to provide the patient with clear distance vision and peripheral vision inferiorly comprising the steps of:
providing a lens with an interior surface and a central spherically curved area, and a peripheral aspheric curved area of approximately one-third a diopter per millimeter,
fixing an eye of the patient behind said spherically curved area looking through its optical center to provide wider field of clear vision,
having a diopter rate of change beginning at the edge of said central vision annd extending to the body periphery,
moving the patient's head to provide clear central vision of side objects by re-establishing a new center vision point,
providing blurred vision for the eye rotating toward the side object when the patient's head remains stationary.

8. A method as set forth in claim 7 including the steps of:
providing the central spherically curved area to provide magnifying means to enable the patient to read without bifocals.

9. A method as set forth in claim 7 including the steps of:
providing a bifocal in said lens to prevent over-plussing of aspheric lenses with bifocal and prevent distorted ground images.

* * * * *